Dec. 31, 1929. C. DE FOREST 1,741,980
WINDOW DISPLAY DEVICE
Filed July 1, 1929
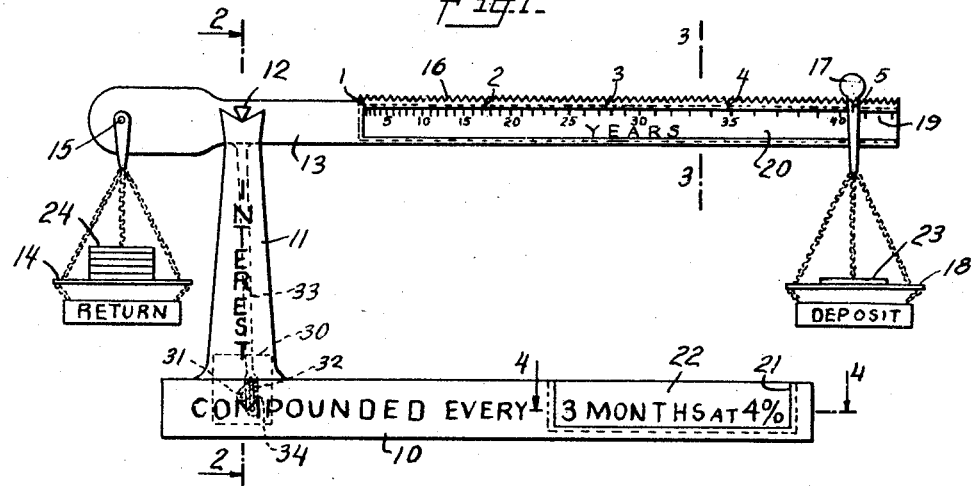
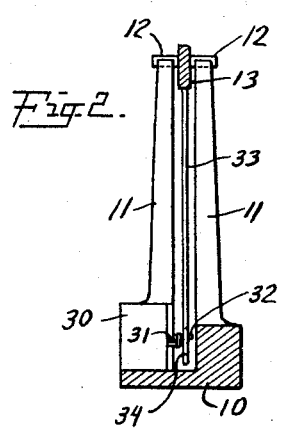
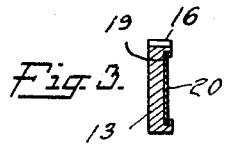
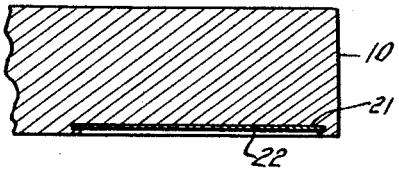
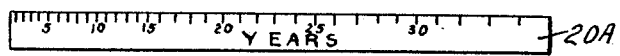
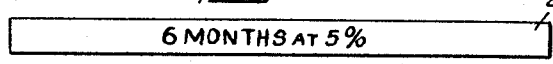
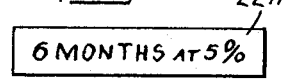
INVENTOR
Charles DeForest
BY
Marshall & Hawley
ATTORNEYS Patented Dec. 31, 1929

1,741,980

UNITED STATES PATENT OFFICE

CHARLES DE FOREST, OF YONKERS, NEW YORK, ASSIGNOR TO AMERICAN PROVIDENT CORPORATION, OF NEW YORK, N. Y., A CORPORATION OF NEW YORK

WINDOW-DISPLAY DEVICE

Application filed July 1, 1929. Serial No. 375,092.

This invention relates to improvements in window display devices especially designed for banking houses and the like.

The device is given the general appearance of a beam scale or balance which is adapted to hold a coin on one of its scale pans and to hold a plurality of like coins on its other scale pan. It is preferably arranged to be given a continuous slight oscillating movement.

In the drawings in which the preferred embodiment of this device is illustrated, Fig. 1 is an elevation of the device which embodies the present invention;

Fig. 2 is a vertical, transverse section of the device, the section being taken on line 2—2 of Fig. 1;

Fig. 3 is a sectional elevation taken on the line 3—3 of Fig. 1;

Fig. 4 is a sectional plan view taken on the line 4—4 of Fig. 1;

Fig. 5 is a front elevation of a scale card;

Fig. 6 is a rear elevation of the same scale card; and

Fig. 7 is a front elevation of an interest card.

10 designates the base of the device, near one end of which are two vertical arms 11, 11, the upper ends of which form seats for knife edge trunnions 12, 12. These project from opposite sides of a scale beam 13 near one of its ends. The scale pan 14 hangs from a point 15 near the shorter end of the scale beam. The upper edge of the scale beam is notched, as shown at 16, to receive a member 17, from which hangs the other scale pan 18.

On the face of the scale beam is a graduation mark 1 which is placed a distance from the trunnions 12 equal to the distance between the trunnions 12 and the point 15. Other graduation marks 2, 3, 4 and 5 are spaced from the trunnions distances equal to twice, three times, four times and five times, as great as the distance between the trunnions and the point 15.

The scale beam is slotted, as at 19, to receive a scale card 20, upon which are certain graduations and numbers which will be described presently with the word "Years" printed conspicuously thereon.

Near one end of the base 10 is a slot 21 which is arranged to receive an interest card 22. Vertically disposed on the front arm 11 is the word "Interest". On the face of the base 10 preceding the slot 19, are the words "Compounded every". Hanging from the scale pan 14 is a tag or label with the word "Return" thereon. A similar tag or label with the word "Deposit" thereon hangs from the scale pan 18.

The scale card 20, illustrated in Fig. 1, has graduations thereon which are so proportioned to cooperate with the graduations 1, 2, 3, 4 and 5, to indicate the number of years it takes to double, triple, etc., the amount of money placed at interest computed quarterly at four percent. The scale card 22 has thereon "3 months at 4%".

When the device is in use with the scale card 20 and the interest card 22 in the respective slots 19 and 21, it is proposed to put a coin 23, such, for example as a ten dollar gold coin, on the scale pan 18, and to put a number of like coins 24 upon the scale pan 14, corresponding in number to the position of the member 17 on the scale beam. In the particular arrangement shown in Fig. 1, the member 17 is over the graduation 5 and five coins 24 are placed on the scale pan 14 to balance the one which is on the scale pan 18. With this position of the parts, the graduations on the scale card 20 will show the number of years it will take to quintuple a deposit placed at interest compounded every three months at four percent, which is approximately forty and one-half years. If the device is arranged to show the number of years it would take to quadruple a deposit similarly compounded at the same rate of interest, the member 17 would be placed over the graduation mark 4 and the number immediately thereunder on the scale card 20 indicating the number of years which it would take to make such an increase would be approximately 35. In the latter case, of course, there would be four coins 24 on the scale pan 14 instead of five.

Another scale card 20A is shown in Figs. 5 and 6. On one side of it is the word "Years" and graduations which in connection with the graduations 1, 2, 3, 4 and 5 indicate the number of years which it would take to increase a deposit at interest compounded every six months at five percent, the words "6 months at 5%", appearing on the back of this scale card, as shown in Fig. 6.

Fig. 7 shows an interest card 22A which is arranged to be used with the scale card 20A.

The device is intended to visually and forcibly impress upon observers the desirability of placing deposits at interest. Various scale cards with their corresponding interest cards, are provided so that any bank desiring to place the device in its show window may select a scale card and an interest card which corresponds to the particular interest paid by such bank and its compounding period.

It is desirable, in order to attract more attention, to impart to the scale beam a slow oscillating movement. For that purpose a motor 30 is provided, which may be of any suitable type, such as clockwork or an electrically driven motor. This comprises a rotary shaft 31 and a crank pin 32 slightly offset from the axis of the shaft 31. An arm 33 depends from the scale beam 13 between the supporting arms 11, 11, and this arm 33 is slotted at its lower end at 34 to provide a sliding engagement with the crank pin 32. It is, of course, to be understood that the shaft 31 is driven slowly so as to give the scale beam a slow oscillating movement to impart to it the appearance of approaching a condition of static equilibrium.

I realize that variations in structure may be made without departing from the spirit and scope of this invention, as defined in the appended claims.

What I claim is:

1. A window display device comprising a scale beam, a frame having a vertical arm, a pivotal connection between the scale beam and the vertical arm, a scale pan depending from the scale beam a fixed distance from said pivotal connection, graduation marks on the scale beam on the other side of the pivotal connection at distances which are multiples of said fixed distance, a scale card on the scale beam having thereon graduations representing time periods computed from an interest table indicating in conjunction with the graduation marks on the scale beam the times required to multiply a deposit placed at compound interest, an interest card indicating the interest table used for such computations, and a scale pan slidably mounted upon the scale beam and adapted to hold a coin, the scale pan which depends from the scale beam at a fixed distance from the pivotal connection being adapted to receive a plurality of coins to balance the coin in the slidable scale pan.

2. A window display device comprising a scale beam, a frame having a vertical arm, a pivotal connection between the scale beam and the vertical arm, a scale pan depending from the scale beam a fixed distance from said pivotal connection, graduation marks on the scale beam on the other side of the pivotal connection at distances which are multiples of said fixed distance, a scale card on the scale beam having thereon graduations representing time periods computed from an interest table indicating in conjunction with the graduation marks on the scale beam the times required to multiply a deposit placed at compound interest, an interest card indicating the interest table used for such computations, a scale pan slidably mounted upon the scale beam and adapted to hold a coin, the scale pan which depends from the scale beam at a fixed distance from the pivotal connection being adapted to receive a plurality of coins to balance the coin in the slidable scale pan, and motive means for oscillating the scale beam.

3. A window display device comprising a scale beam, a frame having a vertical arm, a pivotal connection between the scale beam and the vertical arm, a scale pan depending from the scale beam a fixed distance from said pivotal connection, graduation marks on the scale beam on the other side of the pivotal connection at distances which are multiples of said fixed distance interchangeable scale cards arranged to be placed on the scale beam having thereon graduations representing time periods computed from interest tables indicating in conjunction with the graduation marks on the scale beam the times required to multiply a deposit placed at compound interest, interchangeable interest cards indicating the interest tables used for such computations, and a scale pan slidably mounted upon the scale beam and adapted to hold a coin, the scale pan which depends from the scale beam at a fixed distance from the pivotal connection being adapted to receive a plurality of coins to balance the coin in the slidable scale pan.

4. A window display device comprising a scale beam, a frame having a vertical arm, a pivotal connection between the scale beam and the vertical arm, a scale pan depending from the scale beam a fixed distance from said pivotal connection, graduation marks on the scale beam on the other side of the pivotal connection at distances which are multiples of said fixed distance, interchangeable scale cards arranged to be placed on the scale beam having thereon graduations representing time periods computed from interest tables indicating in conjunction with the graduation marks on the scale beams the times required to multiply a deposit placed at compound interest, interchangeable interest cards indicating the interest tables used for such computations, a scale pan slidably mounted upon the scale beam and adapted to hold a coin, the scale pan which depends from the scale beam at a fixed distance from the pivotal connection being adapted to receive a plurality of coins to balance the coin in the slidable scale pan, and motive means for oscillating the scale beam.

CHARLES DE FOREST.